(12) United States Patent
Alberti et al.

(10) Patent No.: US 10,956,272 B2
(45) Date of Patent: *Mar. 23, 2021

(54) METHOD AND SYSTEM TO DISCOVER AND MANAGE DISTRIBUTED APPLICATIONS IN VIRTUALIZATION ENVIRONMENTS

(71) Applicant: INTERNATIONAL BUSINESS MACHINES CORPORATION, Armonk, NY (US)

(72) Inventors: Enrica Alberti, Rome (IT); Riccardo Rossi, Rome (IT); Antonio Secomandi, Milan (IT); Michele Tomassi, Rome (IT); Viviana Tripodi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 16/108,337

(22) Filed: Aug. 22, 2018

(65) Prior Publication Data

US 2018/0357130 A1 Dec. 13, 2018

Related U.S. Application Data

(63) Continuation of application No. 14/989,581, filed on Jan. 6, 2016, now Pat. No. 10,114,702.

(51) Int. Cl.
*G06F 11/14* (2006.01)
*G06F 11/34* (2006.01)
(Continued)

(52) U.S. Cl.
CPC ........... *G06F 11/1451* (2013.01); *G06F 8/63* (2013.01); *G06F 8/65* (2013.01); *G06F 11/1464* (2013.01);
(Continued)

(58) Field of Classification Search
CPC ............ G06F 11/1451; G06F 11/1469; G06F 2201/84; G06F 11/1464; G06F 8/63;
(Continued)

(56) References Cited

U.S. PATENT DOCUMENTS

| | | | |
|---|---|---|---|
| 5,327,532 A * | 7/1994 | Ainsworth | G06F 9/466 709/248 |
| 6,243,753 B1 * | 6/2001 | Machin | H04L 67/14 709/227 |

(Continued)

OTHER PUBLICATIONS

Gannon et al., "Programming the Grid: Distributed Software Components, P2P and Grid Web Services for Scientific Applications", Cluster Computing 5, pp. 325-336, 2002. (Year: 2002).*

(Continued)

*Primary Examiner* — Phuong Thao Cao
(74) *Attorney, Agent, or Firm* — Tutunjian & Bitetto, P.C.; Jeffrey S. LaBaw

(57) ABSTRACT

A method for managing a plurality of computing machines includes accessing a catalogue memory structure storing a plurality of component signatures, discovering one or more of the software components being instantiated in a software image of each computing machine according to corresponding ones of the component signatures, detecting one or more connections each being established between at least two instantiated software components of different computing machines, receiving a restore command for restoring a target recovery point selected among a plurality of recovery points, and restoring the target recovery point in response to the restore command by restoring the snapshots associated with the target recovery point on corresponding computing machines.

20 Claims, 9 Drawing Sheets

(51) Int. Cl.
G06F 8/61 (2018.01)
G06F 8/65 (2018.01)
G06F 9/455 (2018.01)

(52) U.S. Cl.
CPC ...... G06F 11/1469 (2013.01); G06F 11/3466 (2013.01); *G06F 2009/45562* (2013.01); *G06F 2009/45575* (2013.01); *G06F 2201/81* (2013.01); *G06F 2201/815* (2013.01); *G06F 2201/83* (2013.01); *G06F 2201/835* (2013.01); *G06F 2201/84* (2013.01)

(58) Field of Classification Search
CPC ............ G06F 8/65; G06F 2009/45562; G06F 2009/45575; G06F 2201/83
USPC ...................................................... 707/676
See application file for complete search history.

(56) References Cited

U.S. PATENT DOCUMENTS

| | | | | |
|---|---|---|---|---|
| 7,475,389 B2* | 1/2009 | Johnson | G06F 11/1415 | 714/E11.134 |
| 7,814,309 B1* | 10/2010 | Truong | H04L 45/56 | 713/153 |
| 7,962,590 B1* | 6/2011 | Or | G06F 8/24 | 709/223 |
| 8,151,245 B2* | 4/2012 | Oberlin | G06F 9/5072 | 717/121 |
| 8,166,175 B2* | 4/2012 | Schmieder | H04L 67/14 | 709/227 |
| 8,245,190 B2* | 8/2012 | Buskens | G06F 9/485 | 709/229 |
| 8,280,944 B2* | 10/2012 | Laadan | G06F 11/1438 | 709/201 |
| 8,490,868 B1* | 7/2013 | Kropf | G07F 19/206 | 235/379 |
| 8,621,274 B1* | 12/2013 | Forgette | G06F 11/203 | 714/10 |
| 8,966,198 B1* | 2/2015 | Harris | G06F 11/1451 | 711/161 |
| 9,047,133 B2* | 6/2015 | Winterfeldt | G06F 8/60 | |
| 9,092,248 B1* | 7/2015 | Makin | G06F 9/45558 | |
| 9,804,934 B1* | 10/2017 | Natanzon | G06F 11/1469 | |
| 9,990,118 B1* | 6/2018 | Dennis | G06F 8/61 | |
| 2002/0032806 A1* | 3/2002 | Machin | H04L 69/165 | 719/328 |
| 2005/0055692 A1* | 3/2005 | Lupini | G06F 8/61 | 717/174 |
| 2007/0112893 A1* | 5/2007 | Okada | G06F 11/1471 | |
| 2007/0233698 A1* | 10/2007 | Sundar | G06F 11/2025 | |
| 2007/0244938 A1* | 10/2007 | Michael | G06F 16/128 | |
| 2007/0260733 A1* | 11/2007 | Havemose | G06F 11/1402 | 709/226 |
| 2008/0141241 A1* | 6/2008 | Mills | G06F 8/656 | 717/174 |
| 2009/0158438 A1* | 6/2009 | Pichetti | G06F 21/10 | 726/26 |
| 2009/0165132 A1* | 6/2009 | Jain | G06F 21/51 | 726/22 |
| 2009/0210871 A1* | 8/2009 | Dechovich | G06F 9/4451 | 717/178 |
| 2012/0017114 A1* | 1/2012 | Timashev | G06F 11/1451 | 714/15 |
| 2012/0030513 A1* | 2/2012 | Peng | G06F 11/2097 | 714/37 |
| 2012/0042206 A1* | 2/2012 | Di Domenico | G06F 11/1441 | 714/15 |
| 2012/0054731 A1* | 3/2012 | Aravamudan | G06F 8/63 | 717/170 |
| 2012/0151202 A1* | 6/2012 | Clerc | G06F 12/023 | 713/2 |
| 2012/0192152 A1* | 7/2012 | Oberlin | G06F 9/5072 | 717/121 |
| 2012/0254824 A1* | 10/2012 | Bansod | G06F 8/71 | 717/101 |
| 2012/0271937 A1* | 10/2012 | Cotten | G06Q 10/10 | 709/224 |
| 2012/0311609 A1* | 12/2012 | Taylor | H04L 1/08 | 719/313 |
| 2012/0323853 A1* | 12/2012 | Fries | G06F 11/3072 | 707/649 |
| 2013/0007726 A1* | 1/2013 | Poddar | G06F 8/63 | 717/175 |
| 2013/0167136 A1* | 6/2013 | Goldman | G06F 8/61 | 717/175 |
| 2013/0198718 A1* | 8/2013 | Kunze | G06F 8/61 | 717/121 |
| 2013/0198763 A1* | 8/2013 | Kunze | G06F 8/60 | 719/318 |
| 2013/0219069 A1* | 8/2013 | Yellapragada | G06F 3/0664 | 709/226 |
| 2013/0232463 A1* | 9/2013 | Nagaraja | G06F 8/61 | 717/101 |
| 2013/0232480 A1* | 9/2013 | Winterfeldt | G06F 8/60 | 717/177 |
| 2013/0247020 A1* | 9/2013 | Fontignie | G06F 8/654 | 717/168 |
| 2014/0066193 A1* | 3/2014 | Hollis | G07F 17/3241 | 463/29 |
| 2014/0143392 A1* | 5/2014 | Ciano | G06F 8/63 | 709/221 |
| 2014/0201379 A1* | 7/2014 | Barzily | H04L 67/1002 | 709/228 |
| 2014/0208316 A1* | 7/2014 | Ciano | G06F 8/61 | 718/1 |
| 2015/0039875 A1* | 2/2015 | Di Cocco | G06F 8/63 | 713/2 |
| 2015/0363181 A1* | 12/2015 | Alberti | G06F 8/61 | 717/177 |
| 2015/0370445 A1* | 12/2015 | Wang | G06F 16/986 | 715/765 |
| 2015/0370763 A1* | 12/2015 | Wang | G06F 40/14 | 715/235 |
| 2016/0092195 A1* | 3/2016 | Kuchibhotla | G06F 8/61 | 717/171 |
| 2016/0328226 A1* | 11/2016 | Arya | G06F 8/61 | |
| 2017/0003994 A1* | 1/2017 | Spinks | G06F 8/61 | |
| 2017/0093093 A1* | 3/2017 | El-Charif | H04L 67/1095 | |
| 2017/0185488 A1* | 6/2017 | Kumarasamy | G06F 11/1482 | |
| 2017/0228997 A1* | 8/2017 | Carr | G08B 25/001 | |
| 2017/0286136 A1* | 10/2017 | Dimitrakos | G06F 8/61 | |
| 2018/0159929 A1* | 6/2018 | Heckle | H04L 67/2814 | |

OTHER PUBLICATIONS

Kangarlou et al., "In-Network Live Snapshot Service for Recovering Virtual Infrastructures", IEEE Network, Jul./Aug. 2011, pp. 12-19. (Year: 2011).*

Kangarlou et al., "VNsnap: Taking Snapshots of Virtual Networked Infrastructures in the Cloud", IEEE Transactions on Services Computing, vol. 5, No. 4, Oct.-Dec. 2012, pp. 484-496. (Year: 2012).*

Hwang, J. et al., "Topology Discovery & Service Classification for Distributed-Aware Clouds," IEEE International Conference on Cloud Engineering, Mar. 2014. (pp. 1-6).

List of IBM Patents or Patent Applications Treated as Related dated Aug. 22, 2018, 2 pages.

* cited by examiner

METHOD AND SYSTEM TO DISCOVER AND MANAGE DISTRIBUTED APPLICATIONS IN VIRTUALIZATION ENVIRONMENTS

BACKGROUND

Technical Field

The present disclosure relates to the information technology field. More specifically, this disclosure relates to the management of snapshots in a computing system.

Description of the Related Art

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Snapshots are commonly used to save a representation of corresponding states of a computing machine at particular points in time. For example, the snapshots are very useful in test (computing) environments, such as for software development or customer support purposes. Indeed, the snapshots allow moving back and forth along different states of the computing machines in a relatively short amount of time, since they avoid the need of installing and configuring the corresponding software programs every time. In this way, it is possible to test updates (such as patches or new features) or to troubleshoot errors of software programs in test environments that mimic different production (computing) environments.

These possibilities may be exploited at their best in a virtualized (computing) environment, wherein a computing system hosts multiple virtual (computing) machines (VM). Each virtual machine is defined by a corresponding (virtual) software image, which is formed by a memory structure encapsulating its whole content. The virtual machine is put online by simply mounting its software image and then booting from it. In this way, it is possible to revert the virtual machine to any selected snapshot of its software image by putting the virtual machine offline, dismounting its (current) software image, mounting the software image of the selected snapshot and then putting the virtual machine online again. As a result, the movement back and forth along the different states of the virtual machine is very simple and fast.

However, the management of the snapshots may be quite challenging, especially when the computing system is very large. Therefore, some techniques have been proposed for facilitating this task. For example, US-2012/0323853A describes techniques for capturing and analyzing snapshots of virtual machines. One or more computers may automatically obtain snapshots of virtual machines as they are executing to form a pool of virtual machine snapshots. The virtual machine snapshots are then read to obtain a set of features properties of the virtual machine snapshots, including information about a running guest operating system, software installed on the virtual machine, metadata about the virtual machine itself, and others. The features or properties are analyzed, in one embodiment, using a machine learning algorithm to automatically compute and store information about the virtual machines.

Moreover, techniques are available for managing the deployments of the virtual machines. For example, U.S. Pat. No. 9,047,133B discloses a software deployment system that enables a developer to define a logical, multi-tier application blueprint that can be used to create and manage multiple applications in a cloud infrastructure. In the application blueprint, the developer models an overall application architecture, or topology, that includes individual and clustered nodes (e.g., VMs), logical templates, cloud providers, software deployment environments, software services, application-specific code, properties, and dependencies between top-tier and second-tier components. The application can be deployed according to the application blueprint, which means any needed VMs are provisioned from the cloud infrastructure, and application components and software services are installed. Moreover, "Topology Discovery and Service Classification for Distributed-Aware Clouds", IP.Com, IPCOM000239863, Dec. 5, 2014 discloses a lightweight topology/service detection system that maps a multi-tier application and a service classification algorithm that can determine not only a service type for each multi-tier application, but also the individual virtual machine (VM) application type.

In any case, the computing system may run several software applications, each one comprising software components running on several virtual machines. Moreover, the software components or the whole software applications may have been provided in different versions over time. Therefore, a high number of snapshots may have been taken at successive instants for each virtual machine. It is then quite difficult to get out of this high number of snapshots, with the risk of losing their control.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

The present disclosure is based on the idea of managing the software images at the level of software deployments of software applications.

Particularly, an aspect provides a method for managing a plurality of computing machines, wherein each software image thereof is associated with a software deployment of a software application of each connection that is established among software components of the software application being instantiated in different software images. A target recovery point (comprising a previously taken snapshot of each software image of one or more of the software deployments) is restored in response to a corresponding restore command.

Another aspect provides a method for managing a plurality of computing machines. The method includes accessing a catalogue memory structure storing a plurality of component signatures, discovering one or more of the software components being instantiated in a software image of each computing machine according to corresponding ones of the component signatures, detecting one or more connections each being established between at least two instantiated software components of different computing machines, receiving a restore command for restoring a target recovery point selected among a plurality of recovery points, and restoring the target recovery point in response to the restore command by restoring the snapshots associated with the target recovery point on corresponding computing machines.

A further aspect provides software programs and software program products for implementing the methods.

A further aspect provides corresponding systems.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
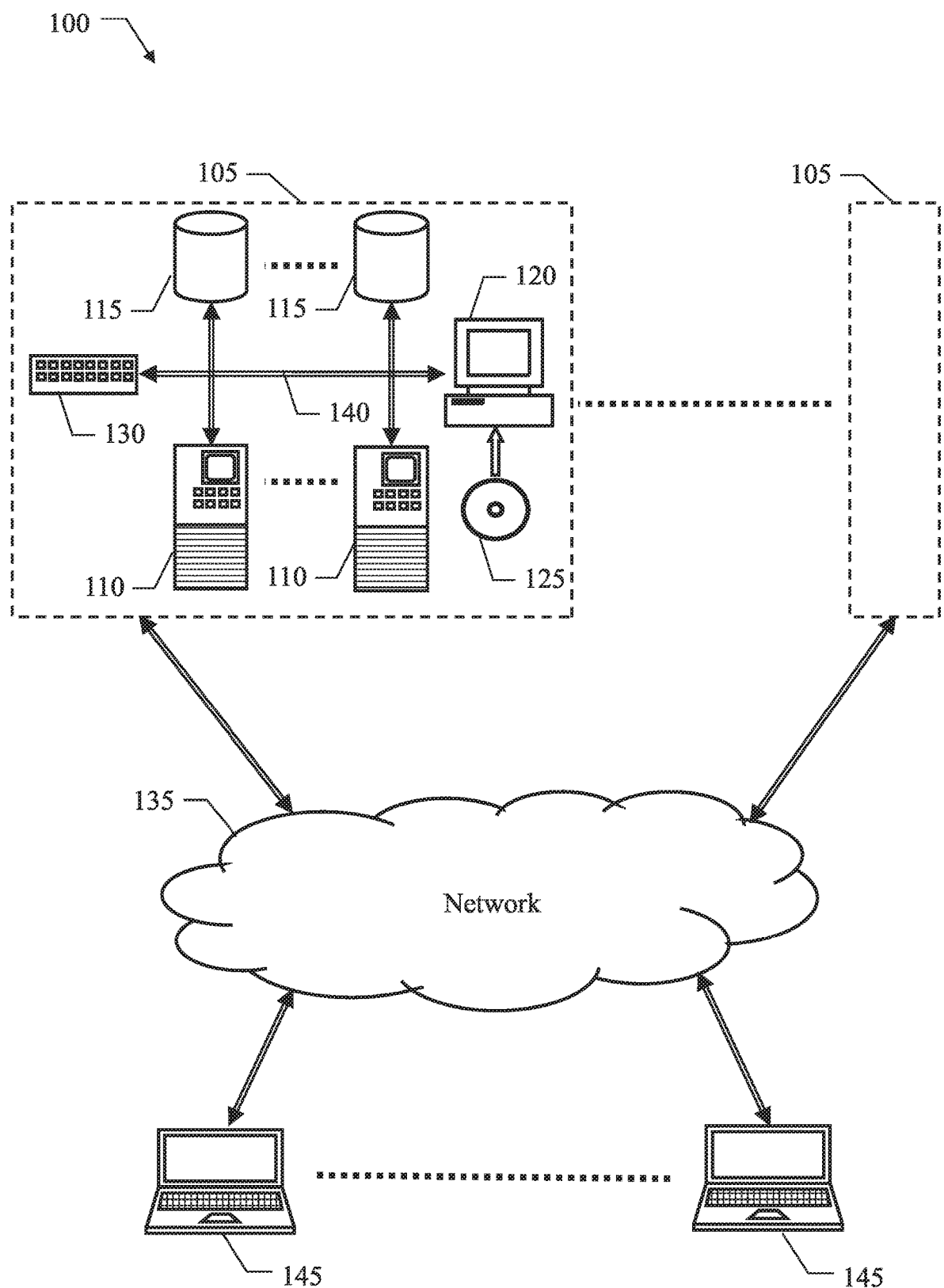
FIG. 1 shows a schematic block-diagram of a computing system wherein the method according to an embodiment of the present disclosure may be applied.

With reference in particular to FIG. 1, a schematic block-diagram is shown of a computing system 100 wherein the method according to an embodiment of the present disclosure may be applied.

The computing system 100 comprises one or more data centers 105. Each data center 105 comprises several sever computing machines, or simply servers, 110 (e.g., of a rack or blade type) and storage disks 115 (e.g., of a RAID type) implementing mass-memories thereof. The data center 105 also comprises a console 120 for controlling it, such as a personal computer, also provided with a drive for reading removable storage units, such as optical disks, 125. A switch/router sub-system 130 manages any communications among the servers 110, the (storage) disks 115 and the console 120, and with a network 135 (e.g., a LAN). In FIG. 1, the servers 110, the disks 115 and the console 120 are connected to the switch/router sub-system 130 through a cabling sub-system 140. The data centers 105 provide services to users thereof. The users may access the data centers 105 by connecting to the data centers 105 via the network 135 with corresponding client computing machines, or simply clients, 145.

With reference now to FIG. 2A-FIG. 2D, the general principles are shown of the method according to an embodiment of the present disclosure.

Figure 2A:
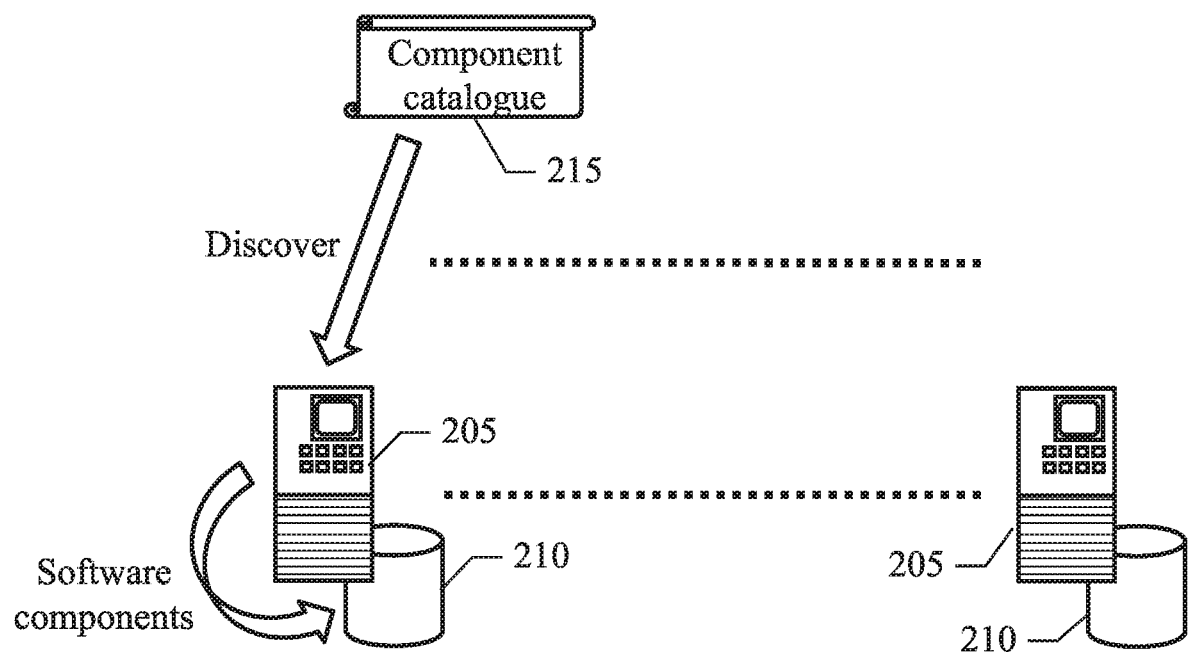
FIG. 2A-FIG. 2D show the general principles of the method according to an embodiment of the present disclosure.

Starting from FIG. 2A, the data centers (not shown in the figure) host a plurality of virtual (computing) machines 205 (e.g., emulation by software of physical computing machines). For example, each server of the data centers runs a hypervisor directly running on its hardware structure (e.g., VMware™ by VMware Inc. or Xen™ by Citrix Systems Inc.) that emulates dedicated virtual hardware structures for its virtual machines 205. Each virtual machine 205 is associated with a software image 210 (e.g., a memory structure encapsulating its whole content), which is mounted by the virtual machine 205 to define a current state thereof. Particularly, the software image 210 may comprise one or more files (such as in the VMDK or VHD format), each one defining a virtual disk (e.g., emulation by software of a physical disk) of the virtual machine 205. For example, the virtual machines 205 may be used by software developers (via their clients, not shown in the figure). Particularly, the software developers may manage (e.g., create, update and/or delete) the virtual machines 205 to define test (computing) environments mimicking different production (computing) environments, which test environments may be used for testing updates (such as patches or new features) or for troubleshooting errors of software programs (such as for software development or customer support purposes).

A component catalogue 215 stores a plurality of component signatures for identifying corresponding (known) software components. Each software component is any software entity (program or data) that may be instantiated individually in each software image 210 (e.g., a server, a gateway, an agent, a database, a file, etc.). The component signature is a statement that may be used to discover whether the software component is instantiated in each software image 210 (e.g., according to the presence of a corresponding file). One or more of the software components that are instantiated in each software image 210 are discovered according to the corresponding component signatures.

Figure 2B:
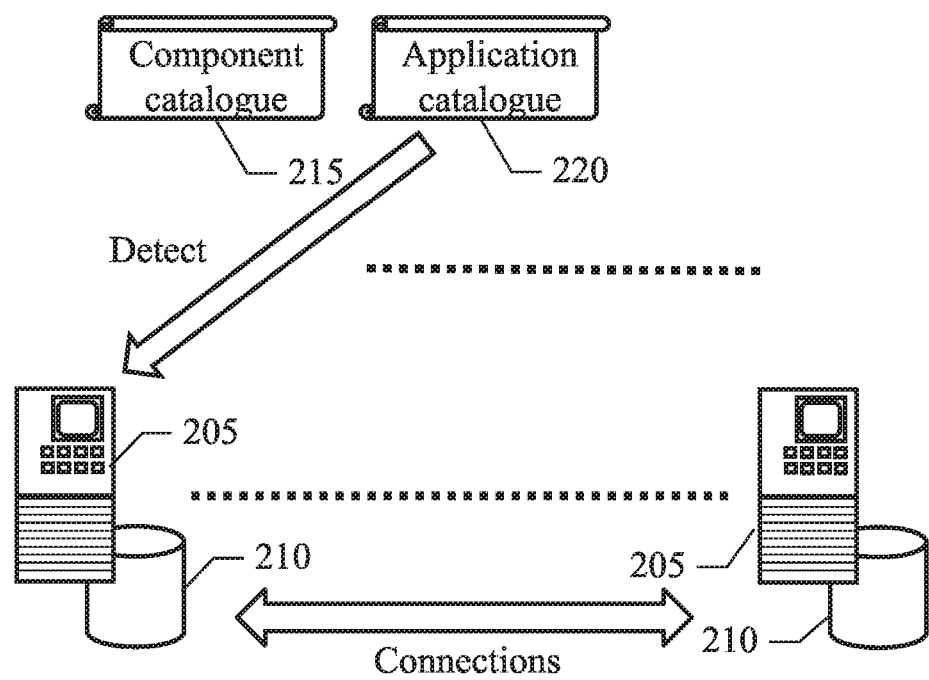

Moving to FIG. 2B, in the method according to an embodiment of the present disclosure, an application catalogue 220 stores a definition of a plurality of (known) software applications. Each software application is formed by one or more software components that are designed to cooperate among them for performing a specific task and may be generally deployed together on one or more virtual machines 205 (e.g., a workload scheduler, a resource manager, a licensing manager and different versions thereof). Particularly, for each software application the application catalogue 220 comprises an indication of its software components and one or more connection signatures. Each connection signature is a statement that may be used to detect whether a corresponding connection is established between two software components (or more) of the software application, and each connection represents any type of interaction between software components, which are instantiated in software images 210 of different virtual machines 205 (e.g., allowing a software component to access another software component or to request services thereto, allowing two software components to communicate or to exchange data between them). One or more of the connections, each one established between two (instantiated) software components (or more) of different virtual machines 205, are identified according to the corresponding connection signatures.

Figure 2C:
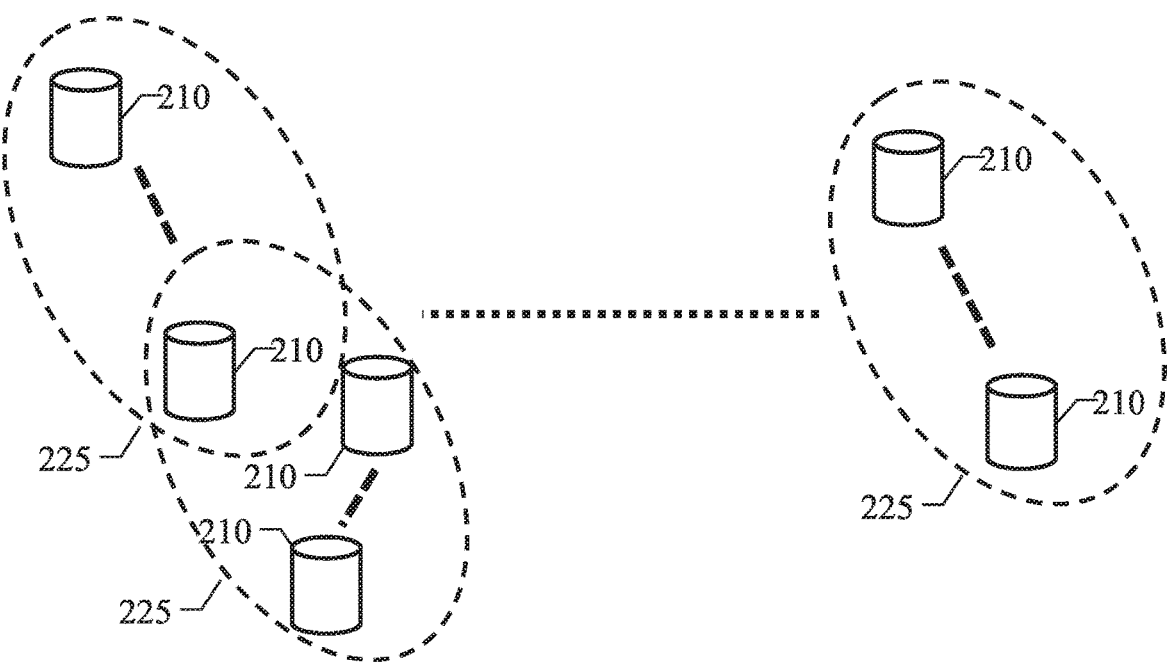

Moving to FIG. 2C, each software image 210 is associated with a software deployment 225 of the software application of each (established) connection of the software image 210. As a result, the software images 210 are (logically) grouped into different software deployments 225, which may be either disjoint (e.g., when they do not share any software image 210) or overlapped (e.g., when they share one or more software images 210 instantiating one or more software components shared among the corresponding software applications).

Figure 2D:
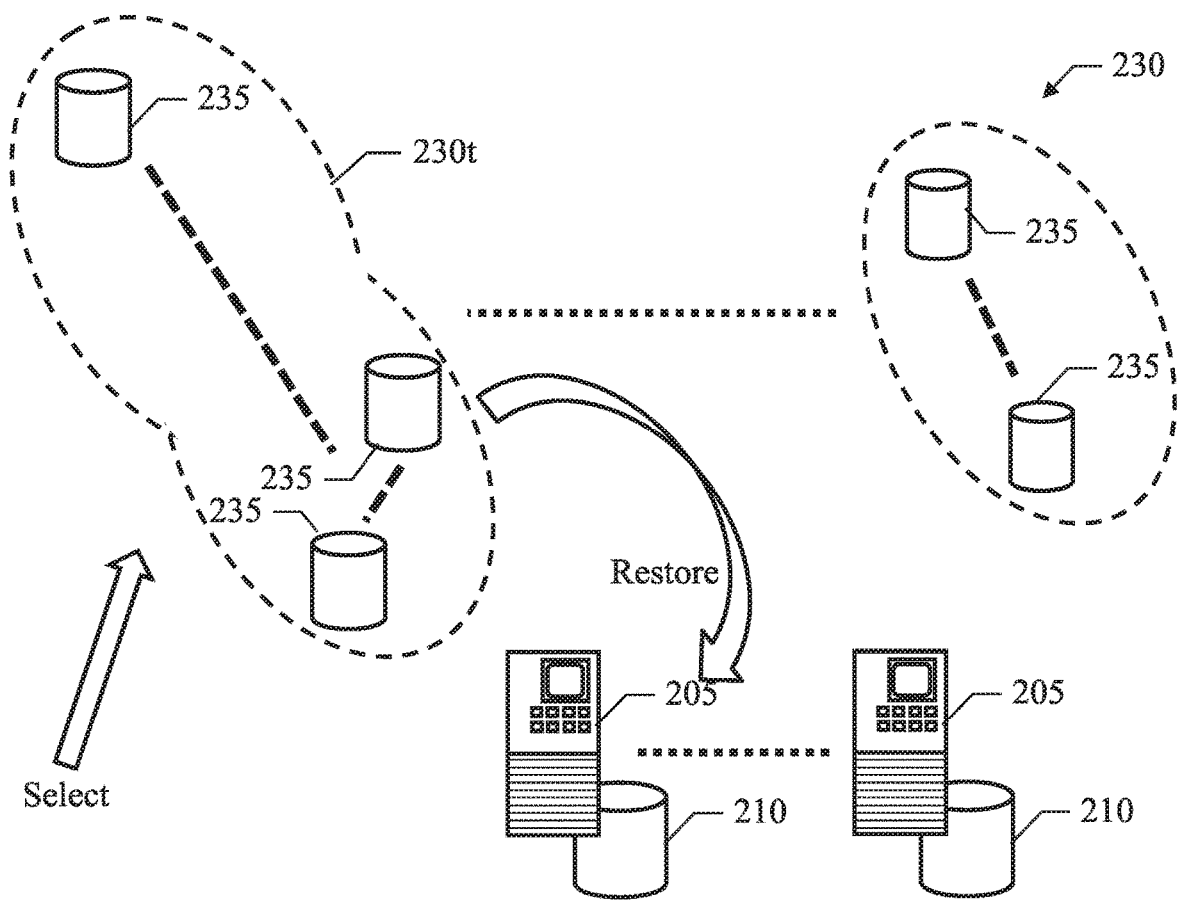

Moving to FIG. 2D, a restore command (e.g., submitted by one of the software developers) is received. The restore command is for restoring a target recovery point 230$t$, which has been selected among a plurality of recovery points 230 that are available. Each recovery point 230 comprises a (previously taken) snapshot 235 of each software image of one or more of the software deployments that are directly or indirectly overlapped (e.g., with each pair of them that shares one or more software images). The target recovery point 230$t$ is then restored. For example, the snapshots 235 of the target recovery point 230$t$ are restored onto the corresponding virtual machines 205 (replacing their software images 210), so as to revert to the corresponding state of the computing system.

In this way, the snapshots are no longer managed individually, but they are managed aggregated at the level of software deployments of corresponding software applications (as discovered according to the connections of the corresponding software components).

All of the above significantly simplifies the management of the snapshots, especially when the computing system is very large. This facilitates maintaining the control of the snapshots, even when the computing system runs several software applications, each one comprising software components running on several virtual machines (with either the software components or the whole software applications provided in different versions over time). For example, despite the high number of snapshots that may be taken at successive instants for each virtual machine, it is now possible to obtain valuable information for the management of the snapshots promptly (such as which versions of the software applications and which software deployments are available, how the virtual machines are used, etc.).

With reference now to FIG. 3A-FIG. 3F, an exemplary application is shown of the method according to an embodiment of the present disclosure.

Figure 3A:
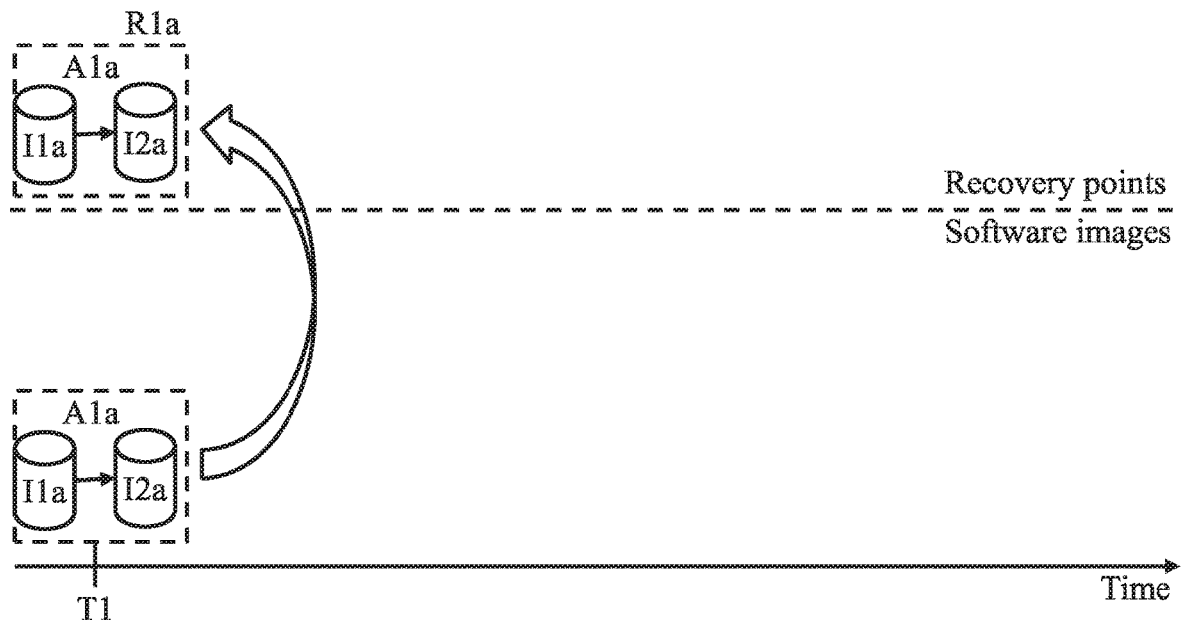
FIG. 3A-FIG. 3F show an exemplary application of the method according to an embodiment of the present disclosure.

Starting from FIG. 3A, at a time T1 two software images I1$a$ and I2$a$ (currently mounted by corresponding virtual machines, not shown in the figure) are available in the computing system. The software images I1$a$ and I2$a$ instantiate different software components of a software application A1, with a connection that is established between them. Therefore, the software images I1$a$, I2$a$ are associated with a software deployment of the software application A1, denoted with the reference A1$a$. Assuming that this state of the computing system has to be preserved (e.g., for a possible next use thereof), a (new) recovery point R1$a$ for the software deployment A1$a$ is saved. For example, a snapshot of the software image I1$a$ and a snapshot of the software image I2$a$ are taken.

Figure 3B:
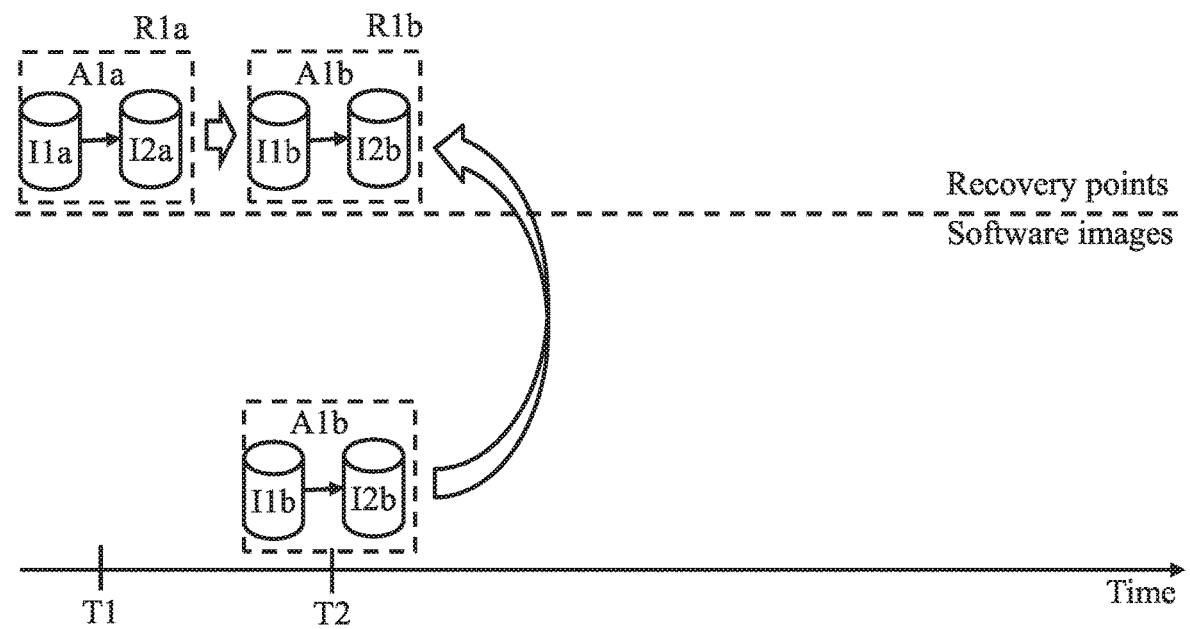

Moving to FIG. 3B, at a next time T2 the software deployment A1$a$ is upgraded to a new version (e.g., by installing a new release thereof), denoted with the reference A1$b$. As a result, the software image I1$a$ and the software image I2$a$ are upgraded accordingly to a software image I1$b$ and a to software image I2$b$, respectively. Assuming that this state of the computing system has to be preserved as well, a (new) recovery point R1$b$ for the software deployment A1$b$ is saved. For example, a snapshot of the software image I1$b$ and a snapshot of the software image I2$b$ are taken. The recovery point R1$b$ logically depends on (e.g., it is an evolution of) the recovery point R1$a$, since it comprises software images for the same virtual machines that are more recent.

Figure 3C:
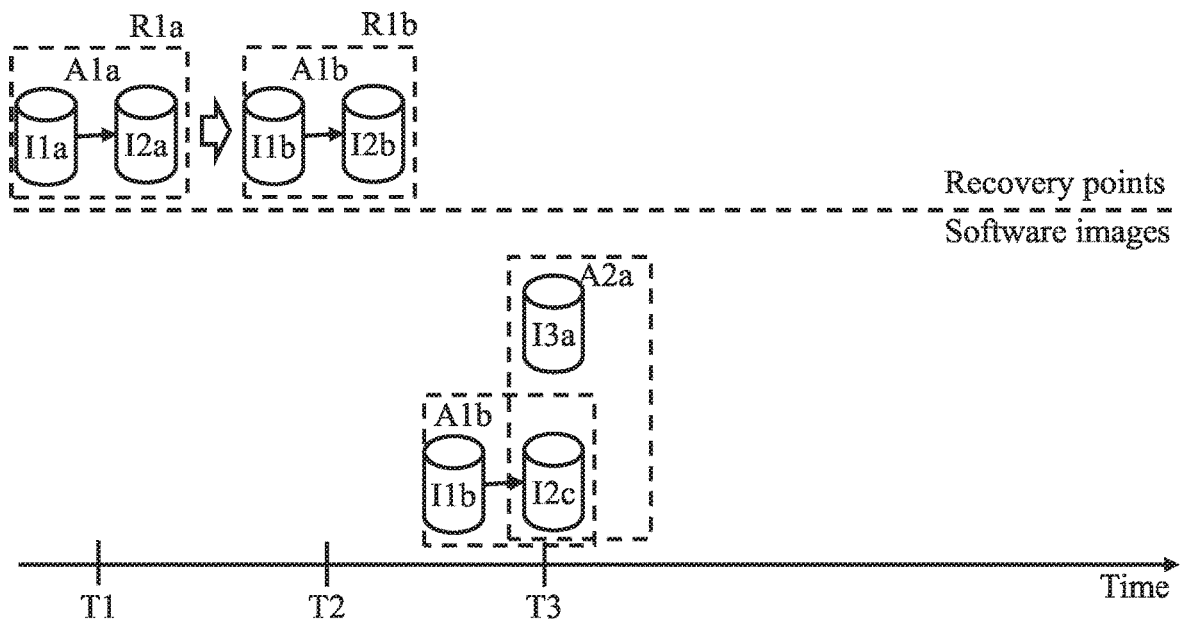

Moving to FIG. 3C, at a next time T3 a (new) virtual machine with a corresponding software image I3$a$ is created and the software image I2$b$ is updated into a software image I2$c$ (without affecting the software deployment A1$b$). The software images I2$c$ and I3$a$ instantiate different software components of another software application A2, with a connection that is established between them. Therefore, the software images I2$c$, I3$a$ are associated with a software deployment of the software application A2, denoted with the reference A2$a$. In this case, the software deployment A2$a$ is overlapped to the software deployment A1$b$ since they share the software image I2$c$ (e.g., storing a software component in common to both of them).

Figure 3D:
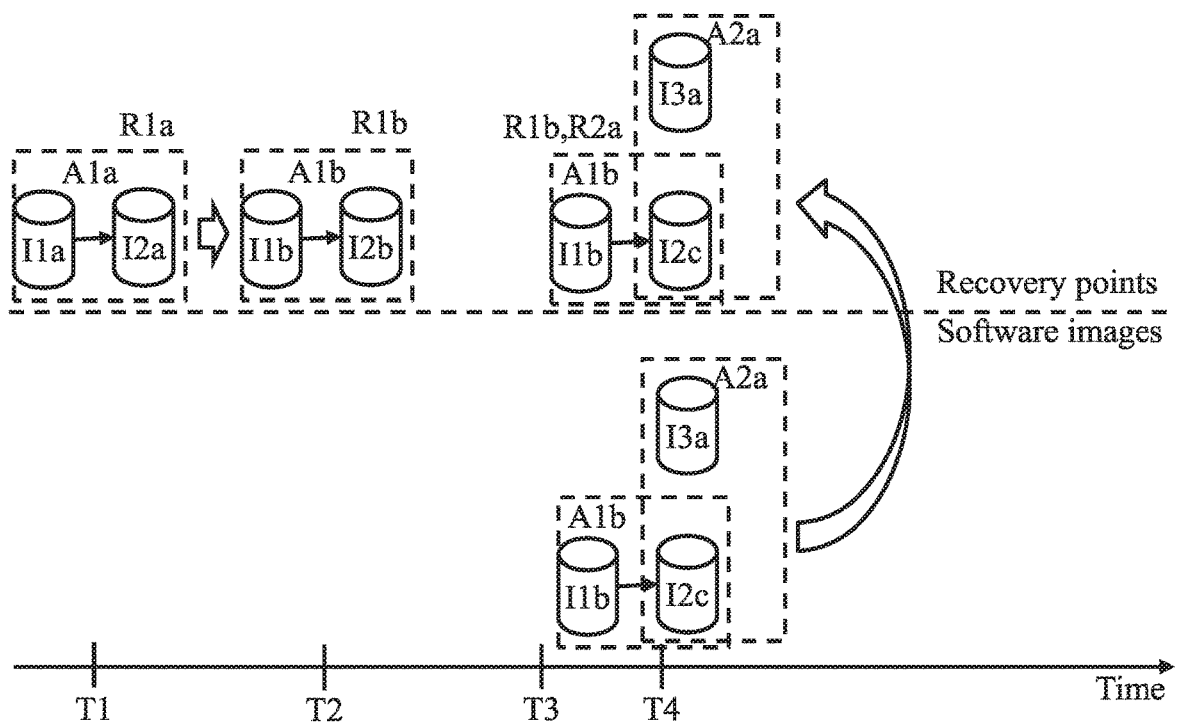

Moving to FIG. 3D, at a next time T4 the (target) recovery point R1$a$ has to be restored. In this case, in the current state of the computing system, the software deployment A1$b$ corresponding to the recovery point R1$a$ is identified (e.g., when they relate to the same virtual machines). Moreover, again in the current state of the computing system, the software deployment A2$a$ that is overlapped to the software deployment A1$b$ is identified. The virtual machines of the software deployments A1$b$ and A2$a$ are suspended (since the restoring of the recovery point R1$a$ may impact them compromising their operation). A (new) recovery point Rib, R2$a$ (corresponding to the software deployments A1$b$ and A2$a$) is saved. For example, a snapshot of the software image I1$b$ (for the software deployment A1$b$), a snapshot of the software image I3$a$ (for the software deployment A2$a$) and a snapshot of the software image I2$c$ (for both of them) are taken, so as to consolidate them into a reachable state of the computing system.

Figure 3E:
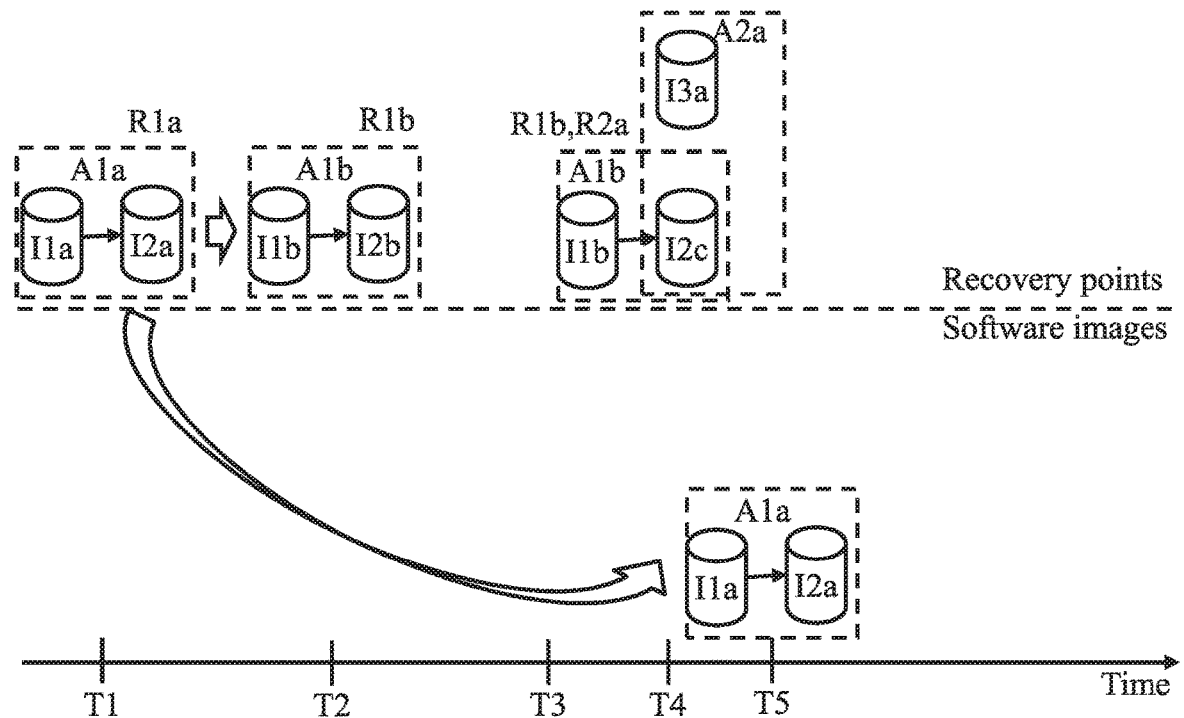

Moving to FIG. 3E, at a next time T5 the recovery point R1$a$ may now be restored. For this purpose, the snapshots of the software images I1$a$ and I1$b$ are restored onto the corresponding virtual machines (replacing the software images I1$b$ and I2$c$, respectively). At the same time, the software image I3$a$ is deleted or ignored (and the corresponding virtual machine is suspended).

Figure 3F:
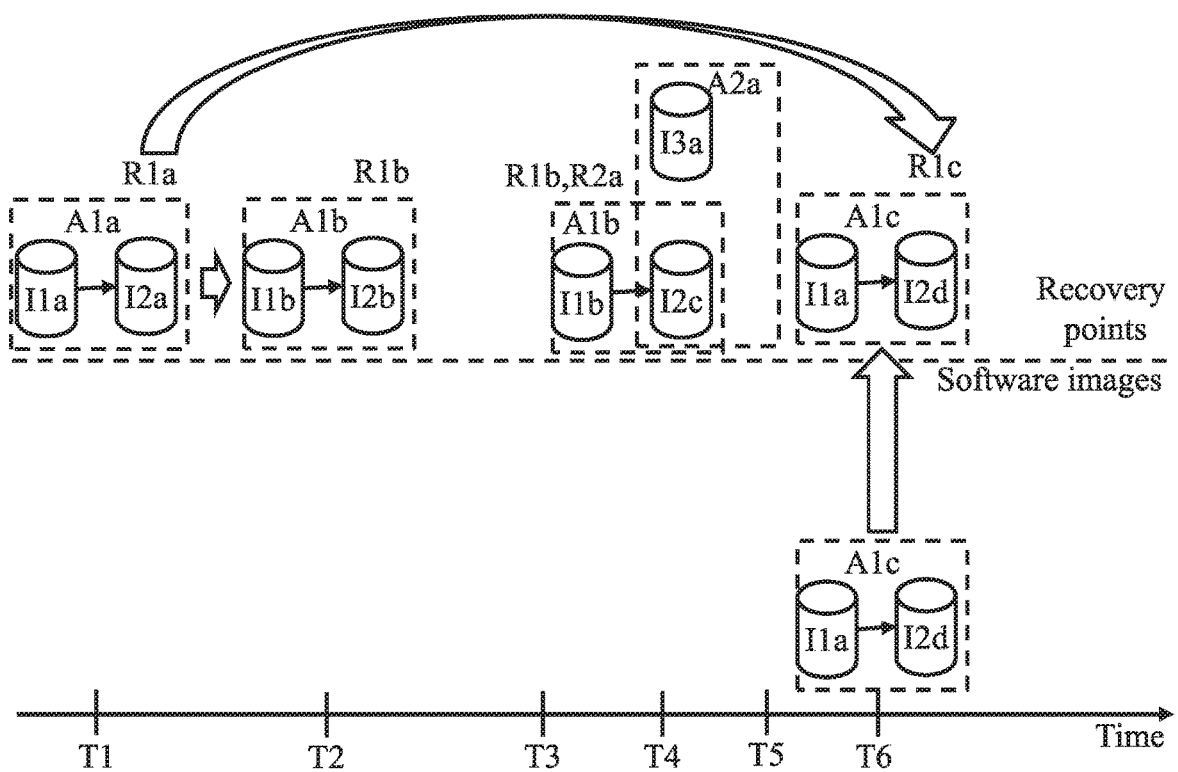

Moving to FIG. 3F, at a next time T6 the software deployment A1$a$ is upgraded to a new version (e.g., by applying a patch), denoted with the reference A1$c$. As a result, the software image I1$a$ is upgraded accordingly into a software image I2$d$. Assuming that this state of the computing system has to be preserved, a (new) recovery point R1$c$ for the software deployment A1$c$ is saved. For example, a snapshot of the software image I2$d$ is taken (while the snapshot of the software image I1$a$ is already available in the recovery point R1$a$). The recovery point R1$c$ as well logically depends on (e.g., it is a further evolution of) the recovery point R1$a$.

Figure 4:
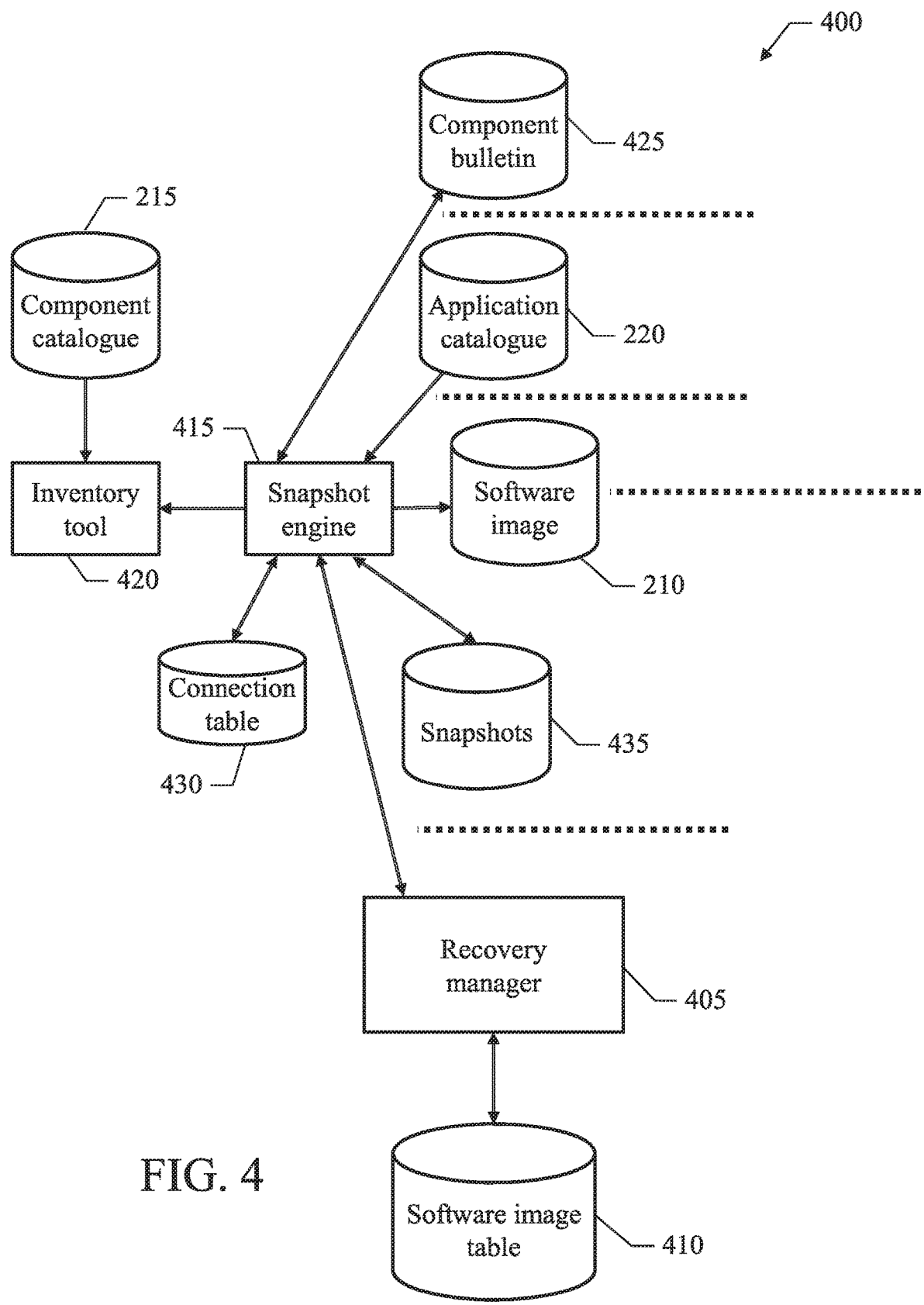
FIG. 4 shows the main software components that may be used to implement the method according to an embodiment of the present disclosure.

With reference now to FIG. 4, the main software modules are shown that may be used to implement the method according to an embodiment of the present disclosure.

All the software modules (programs and data) are denoted as a whole with the reference 400. The software modules 400 are typically stored in the mass memory and loaded (at least partially) into the working memory of the above-mentioned computing system when the programs are running. The programs are initially installed into the mass memory, for example, from removable storage units and/or from the network. In this respect, each program may represent a module, segment or portion of code, which comprises one or more executable instructions for implementing the specified logical function.

Particularly, a recovery manager 405 (e.g., running in a dedicated virtual machine) is used to manage all the software images that are available in the computing system, comprising both the software images that are currently in use (as being mounted by the corresponding virtual machines) and the software images that are saved in the corresponding snapshots (and then the resulting recovery points). For example, the recovery manager 405 exposes a graphical user interface that allows browsing the software images, and that allows saving, restoring, and deleting the recovery points. For this purpose, the recovery manager 405 controls (e.g., in read/write mode) a software image table 410 that stores a representation of the software images (identified by corresponding unique IDs), organized in their software deployments arranged in a tree according to their dependencies.

The recovery manager 405 interacts with a snapshot engine, or avatar, 415 that is provided individually for each virtual machine. The snapshot engine 415 (identified by a unique ID) runs in a dedicated process (outside its virtual machine) or in the hypervisor to control the corresponding snapshots. In this way, the virtual machines cooperate among them in a peer-to-peer way, thereby distributing the corresponding computing load with a beneficial effect on the performance of the whole computing system. The snapshot engine 415 accesses (in read mode only) the software image 210 of its virtual machine for analyzing (e.g., introspecting) it.

Particularly, the snapshot engine 415 leverages an inventory tool 420 (e.g., IBM Tivoli Common Inventory Technology™ (CIT) by IBM Corporation), which in turn accesses (in read mode only) the component catalogue 215 (e.g., maintained according to information supplied by vendors of the software components) to discover the software components instantiated in the software image 210. For example, the component catalogue 215 comprises an entry for each (known) software component (described by its name and release, and identified by a unique ID). The entry of each software component stores one or more component instructions and a discovery rule. The component instructions are commands that may be executed (by the snapshot engine 415 on the software image 210) for collecting component parameters of the software image 210 to be used for discovering whether the software component is instantiated therein (e.g., returning a Boolean value indicating the presence of a file). The discovery rule comprises a condition based on the component parameters, which condition evaluates to true when the software component in instantiated in the software image 210 (e.g., when a specific file defined by its name, size and checksum is present).

Moreover, the snapshot engine 415 accesses (in read mode only) the application catalogue 220 (e.g., maintained according to information supplied by vendors of the software applications) to identify the connections established in the software image 210. For example, the application catalogue 220 defines (forward) connections, each one from a source software component to a target software component. The application catalogue 220 comprises an entry for each (known) software application (described by its name and release, and identified by a unique ID), which in turn comprises an entry for each software component thereof (identified by its ID). When the entry is for a target software component, it stores a target section comprising one or more target instructions and one or more validation instructions. The target instructions are commands that may be executed (e.g., by the snapshot engine 415 on the software image 210) for collecting the values of connection parameters of the target software component to be used for detecting any connection that is established to it (e.g., extracting a port on which the target software component is waiting from a service file thereof). Likewise, the validation instructions are commands that may be executed (by the snapshot engine 415 on the software image 210) for collecting the values of validation parameters of the target software component to be used for validating any connection that is established to it (e.g., extracting a release of the target software component from its property file). In addition or in an alternative embodiment, the entry of each software component comprises a source section for each connection of which it is a source software component. Each source section stores one or more source instructions and a validation rule. The source instructions are commands that may be executed (e.g., by the snapshot engine 415 on the software image 210) for collecting the values of the connection parameters of the source software component (the same as the connection parameters of the corresponding target software component), to be used for detecting any connection that is established from it (e.g., extracting a port on which the source software component connects from a service file thereof). The validation rule comprises a condition based on the values of the validation parameters of the corresponding target software component, which condition evaluates to true when the connection is valid (e.g., when the release of the target software component falls within an acceptable range).

All the snapshot engines 415 may write (alternatively) and may read (concurrently) a component bulletin 425, which is shared among them. The component bulletin 425 stores information about the target software components instantiated in all the software images 210 that may be used to detect the corresponding connections. For example, the component bulletin 425 comprises an entry for each target software component (identified by the ID of its software application, the ID of its snapshot engine 415 and the ID of its software image 210). The entry comprises the corresponding values of the connection parameters and of the validation parameters (e.g., in the form of key/value pairs), and a time-stamp of the discovering of the target software component.

Each snapshot engine 415 controls (in read/write mode) a connection table 430 that stores an indication of its connections. For example, the connection table 430 comprises an entry for each connection that is established in the software image 210 from or to another software image 210 (as identified by its ID and the ID of the corresponding snapshot agent). Moreover, the snapshot engine 415 controls (in read/write mode) a snapshot repository 435 that stores all the snapshots that have been taken over time for its software image 210.

Figure 5A:
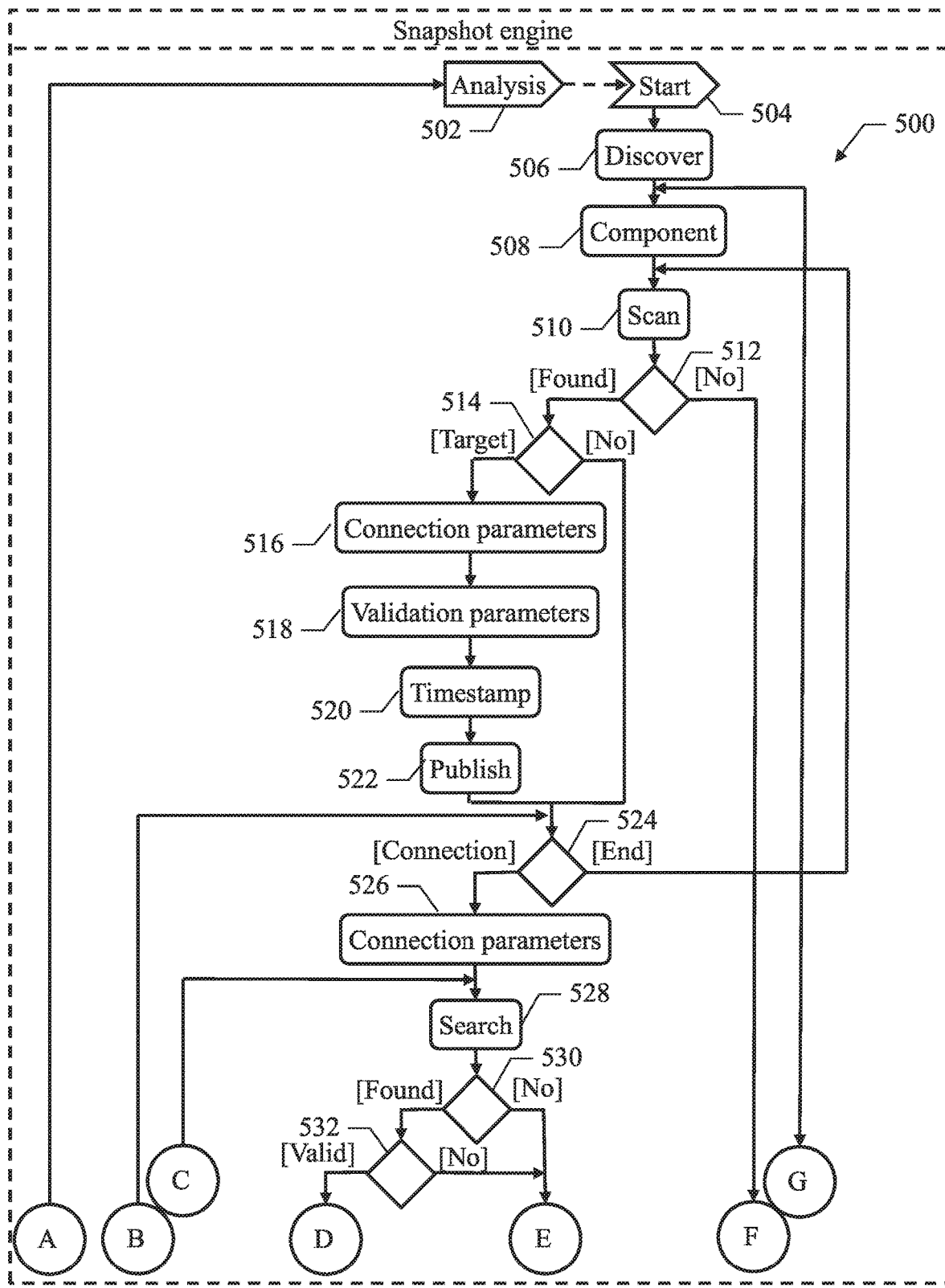
FIG. 5A-FIG. 5B show an activity diagram describing the flow of activities relating to an implementation of the method according to an embodiment of the present disclosure.
Figure 5B:
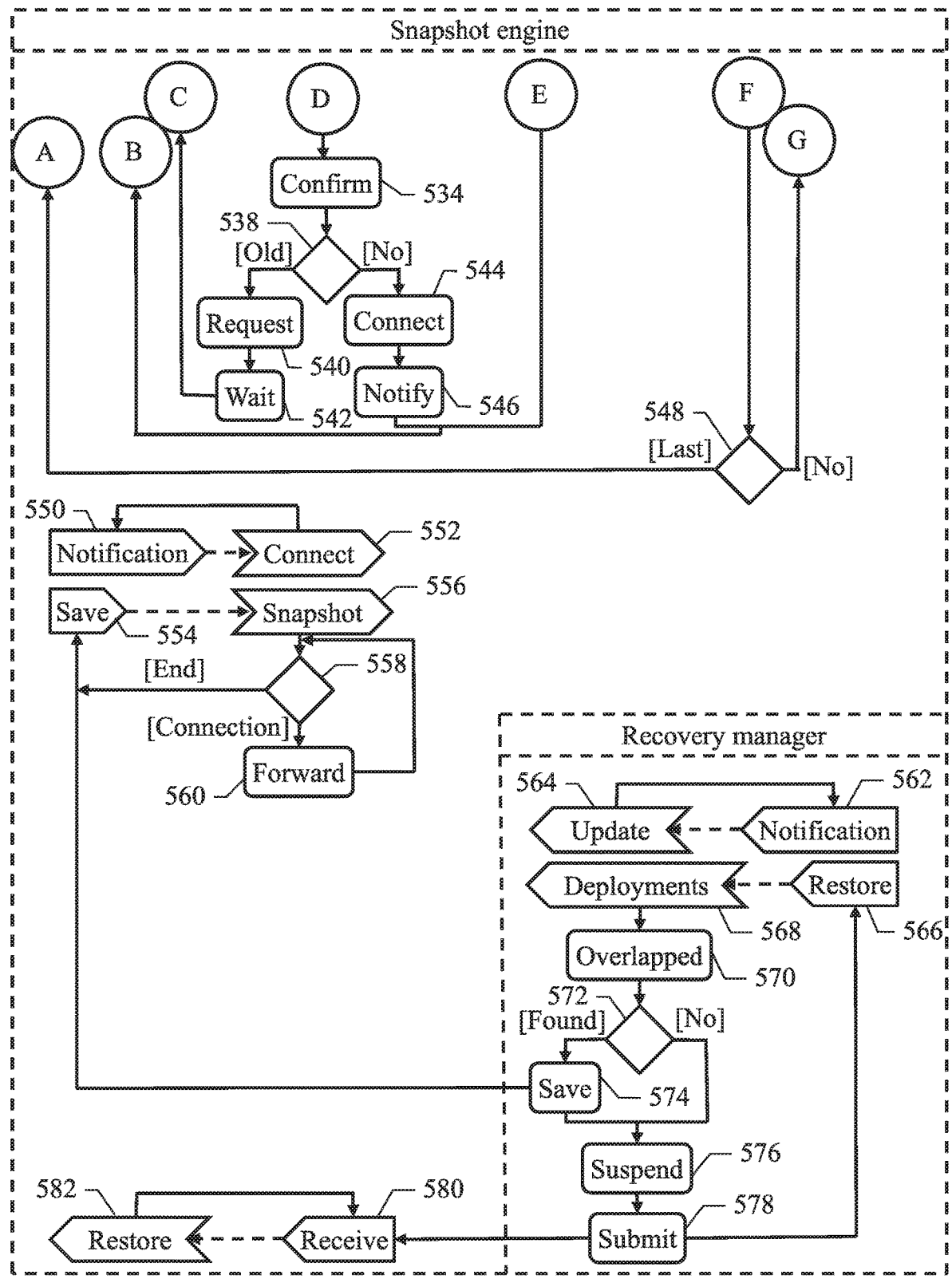

With reference now to FIG. 5A-FIG. 5B, an activity diagram is shown describing the flow of activities relating to an implementation of the method according to an embodiment of the present disclosure.

Particularly, the diagram represents an exemplary method that may be used to manage the snapshots of the computing system with a method 500. In this respect, each block of the diagram may correspond to one or more executable instructions for implementing the specified logical function in the computing system.

Each snapshot engine (only one shown in the figure) is waiting at block 502 in its swim-lane for any analysis requests (for analyzing its software image). The method passes to block 504 when a (new) analysis request is received (e.g., from a scheduler on a scheduled basis, such as periodically every 1-7 days, from the recovery manager upon a manual submission by the users or from another snapshot engine, as described in the following, etc.). In response thereto, the snapshot engine analyzes the software image (with its virtual machine either online or offline). For this purpose, the snapshot engine deletes any corresponding (old) entries in the component bulletin that have been published during a previous analysis of the software image (identified by the ID of the snapshot engine), and then it accesses the component catalogue and the application catalogue (e.g., by opening them, if necessary). Continuing to block 506, the snapshot engine (through the inventory tool) discovers the software components that are instantiated in its software image according to the corresponding component signatures (extracted from the component catalogue), for example, by standard inventory techniques.

The snapshot engine then performs a loop for processing the software components that have been discovered. The loop begins at block 508 wherein a (current) software component is taken into account (starting from a first one in any arbitrary order). Continuing to block 510, the snapshot engine scans the application catalogue (starting from its beginning) looking for any entry for the software component. The flow of activity branches at block 512 may depend on a result of this scan. If an entry of the software component is found, the snapshot engine at block 514 verifies whether it comprises the target section (meaning that it is for a target software component). If so, the snapshot engine at block 516 executes the target instructions (extracted from the application catalogue) on the software image to collect the values of the corresponding connection parameters. Likewise, the snapshot engine at block 518 executes the validation instructions (extracted from the application catalogue) on the software image to collect the values of the corresponding validation parameters. The snapshot engine at block 520 then collects a timestamp indicating a current time (e.g., provided by a system clock). At this point, the snapshot engine at block 522 adds a new entry for the target software component into the component bulletin, and then publishes the ID of the corresponding software application (extracted from the application catalogue), the ID of the snapshot engine (extracted from a configuration file thereof), the ID of the software image (extracted from a descriptor thereof), the values of the connection parameters, the values of the validation parameters and the timestamp (just collected).

The method then descends into block 524. The same point is also reached directly from the block 514 when the entry of the software component does not comprise the target section (meaning that it is not for a target software component). At this point, the snapshot engine scans the entry of the software component again (starting from its beginning) looking for any source section. If a source section (for a connection of which the software component is a source software component) is found, the snapshot engine at block 526 executes the source instructions (extracted from the application catalogue) on the software image to collect the values of the corresponding connection parameters. The snapshot engine at block 528 searches any target software components in the connection bulletin belonging to the same software application (e.g., having the same ID of the software application of the source software component extracted from the application catalogue) and matching the values of the connection parameters of the source software component (e.g., having the same values of the same connection parameters just collected).

The flow of activity branches at block 530 may depend on a result of this search. If one or more target software components have been found, the snapshot engine at block 532 verifies whether the values of the validation parameters of each target software component (retrieved from the component bulletin) fulfill the validation rule (extracted from the application catalogue). For example, the snapshot engine evaluates the validation rule with the values of the validation parameters of the target software component and it discards the target software component if the result is false. This allows discriminating deployment of different versions of the same software application that may have the same values of the connection parameters, or inconsistent states wherein the software deployment has been updated only partially (with some software components thereof still at a previous version).

The method descends into block 534 in FIG. 5B if the validation rule is fulfilled by at least one of the target software components (meaning that the corresponding connection is valid). Optionally, in this phase the user may be also requested to confirm the target software component (e.g., in uncertain situations). Continuing to block 538 (assuming that the target software component is confirmed, either automatically or manually), the snapshot engine verifies whether the timestamp of the target software component (retrieved from the component bulletin) is too old, e.g., a difference from a current time is (possibly strictly) higher than a threshold (extracted from the configuration file of the snapshot engine). If so, the snapshot engine at block 540 sends an analysis request to the snapshot engine of the target software component (as identified by its ID retrieved from the component bulletin), so as to cause it to repeat the analysis of its software image and then refresh the corresponding information into the component bulletin. The snapshot engine then enters a waiting condition at block 542 for a completion of the analysis of the target software image (e.g., notified by its snapshot engine). Once the analysis of the target software image has been completed (or in any case after a predefined time-out) the flow of activity returns to the block 528 in FIG. 5A to repeat the same operations. This increases the accuracy, since it avoids basing the detection of the connections on information that is too old, with the risk of establishing connections with target software components that are not available any longer.

Returning to the block 538 in FIG. 5B, the method instead descends into block 544 when the timestamp of the target software component is not too old (meaning that its information in the connection bulletin is sufficiently reliable). Therefore, the snapshot engine establishes a (new forward) connection from the source software component to the target software component. For example, the snapshot engine adds an indication of this connection (identified by the IDs of the corresponding target software image and of its snapshot agent retrieved from the connection bulletin) into its connection table. Continuing to block 546, the snapshot engine (of the source software image) notifies the connection that has just been established (identified by the IDs of the source software image and of its snapshot engine, extracted from its descriptor) to the snapshot engine of the target software image. At the same time, the snapshot engine notifies the same connection (now identified by the IDs of the source software image and of the target software image) to the recovery manager.

The flow of activities returns to the block 524 in FIG. 5A from the block 546 (when the connection has been established). The same point is also reached otherwise from the block 532 (when the values of the validation parameters of every target software component do not fulfill the validation rule, meaning that no connection is valid) or from the block 530 (when no target software component has been found in the component bulletin). Referring back to block 524, this causes the snapshot engine to continue the scan of the entry of the software component (starting from the current point that has been reached) looking for any further source section. Once an end of the entry of the software component has been reached (directly when the entry of the software component does not comprise any source section, meaning that it is not for a source software component) the flow of activities returns to the block 510 to continue the scan of the application catalogue (starting from the current point that has been reached) looking for any further entry for the software component. Once an end of the application catalogue has been reached (directly when the application catalogue does not comprise any entry for the software component, meaning that it is not part of any software application), the method descends into block 548 of FIG. 5B. At this point, the snapshot engine verifies whether a last software component of the software image has been processed. If not, the method returns to block 508 of FIG. 5A to repeat the same operations for a next software component. Conversely, once all the software components of the software image have been processed, the corresponding loop is exited and the analysis of the software image is completed by returning to block 502, waiting for a next analysis request.

In a completely independent way, each snapshot engine is waiting at block 550 for the notifications of any connection that has been established to a target software component thereof in FIG. 5B. The method passes to block 552 as soon as this notification is received from the snapshot engine of the corresponding source software component. In response thereto, the snapshot engine establishes a corresponding (new backward) connection to its target software component from the corresponding source software component. For example, the snapshot engine adds an indication of this connection (identified by the IDs of the source software image and of the snapshot engine indicated in the notification) into its connection table. The method then returns to block 550 waiting for the notification of a further connection that has been established.

In a completely independent way, each snapshot engine is waiting at block 554 for any save commands. The method passes to block 556 when a (new) save command is received. The save command may be submitted manually by the users or it may be generated automatically (as described in the following). In response to the save command, the snapshot engine takes a snapshot of its software image (e.g., after putting its virtual machine offline temporarily), which snapshot is added to its snapshot repository (together with the corresponding connection table). Once this operation has been successfully completed, the snapshot engine notifies the taking of the snapshot (as identified by the ID of its software image) to the recovery manager. Continuing to block 558, the snapshot engine scans its connection table (starting from the beginning) looking for any (direct) connection that has been established from the corresponding software image. If a connection is found, the snapshot engine at block 560 forwards the save command to the corresponding snapshot engine (identified by its ID extracted from the connection table), so as to cause it to perform the same operations. In this way, the save command is propagated to the snapshot engines of all the virtual machines whose software images are directly or indirectly connected among them. The flow of activity then returns to block 558 to continue the scan of the connection table (starting from the current point that has been reached) looking for any further connection. Once an end of the connection table has been reached (directly when no connection is established from the software image) the flow of activities returns to block 554 waiting for a next save command.

Moving to the swim-lane of the recovery manager, it is waiting at block 562 for any notifications from the snapshot engines. The method passes to block 564 when this notification is received. Particularly, the recovery manager may receive the notification that a connection has been established (from a source software image to a target software image), and then the source and target software images have became part of a (new or existing) software deployment, that a (new) snapshot has been taken of a software image or that a snapshot has been restored. In response thereto, the recovery manager updates the software image table accordingly. As a result, the recovery manager may provide an up-to-date view of the software applications that are currently deployed in the computing system and of the recovery points that are available for restoring different versions thereof, together with their evolution over time. The method then returns to block 562 waiting for a further notification from the snapshot engines.

In an alternate embodiment, the recovery manager is waiting at block 566 for any restore commands. The restore command may be submitted manually by the users for a selected recovery point. The method passes to block 568 when a (new) restore command is received. In response thereto, the recovery manager determines the current (dependent) software deployments corresponding to the target recovery point, which software deployments may then be impacted by the restoring of the target recovery point (e.g., whose software images relate to the same virtual machines). The recovery manager at block 570 verifies whether any software deployments exist that are directly or indirectly overlapped to at least one of the dependent software deployments, and then may be impacted by the restoring of the target recovery point as well. The flow of activity branches at block 572 may depend on the result of this verification. Particularly, if one or more overlapped software deployments have been found, the recovery manager at block 574 submits a (new) save command to the snapshot engine of one of the software images of the dependent or overlapped software deployments (chosen in any way), so as to cause the saving of a (new) recovery point corresponding to all the impacted (dependent and overlapped) software deployments (by taking a snapshot of the corresponding software images as described above). The method then descends into block 576 The same point may be also reached directly from the block 572 when no overlapped software deployment has been found. In both cases, the recovery manager suspends the virtual machines of all the impacted software images (e.g., after sending a warning to their users). The recovery manager at block 578 may now submit the restore command to the snapshot engine of each software image of the target recovery point, by passing an indication of the corresponding software image to the restored (identified by its ID extracted from the software image table). The method then returns to block 566 waiting for a further restore command.

Returning to the swim-lane of each snapshot engine, it is waiting at block 580 for any restore commands. The method passes to block 582 when a (new) restore command is received (from the recovery manager). In response thereto, the snapshot engine restores the snapshot of the required software image (identified by its ID indicated in the restore command). For this purpose, the snapshot engine puts its virtual machine offline, dismounts the (current) software image, mounts the software image to be restored together with its connection table (extracted from the snapshot repository) and then puts the virtual machine online again. The method then returns to block 580 waiting for a next restore command.

Naturally, to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (e.g., not limited to the recited items). The terms based on, dependent on, according to, function of (and any forms thereof) should be intended as a non-exclusive relationship (e.g., with possible further variables involved). The term a/an should be intended as one or more items (unless expressly indicated otherwise), and the term means for (or any means-plus-function formulation) should be intended as any structure adapted or configured for carrying out the relevant function.

For example, an embodiment provides a method for managing a plurality of computing machines. However, the computing machines may be in any number and of any type (even of physical type).

In an embodiment, the method comprises accessing a catalogue memory structure. However, the catalogue memory structure may be of any type (e.g., a file or a database) and with any arrangement (e.g., a single memory structure for both the software components and the software applications, a dedicated memory structure for the software component and a dedicated memory structure for all the software applications or for each one of them).

In an embodiment, the catalogue memory structure stores a plurality of component signatures for discovering corresponding software components. However, the component signatures may be of any type (e.g., with statements of any type, such as based on registry keys, and combined in any way, such as with logical operators and/or programming constructs, such as if-then-else). Moreover, the component signatures may be used to discover software components of any type (e.g., multimedia contents).

In an embodiment, for each one of a plurality of software applications the catalogue memory structure stores an indication of one or more of the software components belonging to the software application. However, the software applications may be in any number (e.g., a single one for multiple versions of the same software application, different ones for corresponding versions or groups thereof) and of any type (e.g., office suites, authentication services, etc.).

In an embodiment, for each one of a plurality of software applications the catalogue memory structure stores one or more connection signatures for detecting corresponding connections each one between at least two of the software components of the software application. However, the connection signatures may be of any type (e.g., with statements of any type and combined in any way, such as with logical operators and/or programming constructs, such as if-then-else). Moreover, they may be used to discover connections in any number and of any type (e.g., allowing a software component to download data from another software component), with each connection that may be among any number of software components (e.g., with two or more source software components connected to a same target software component).

In an embodiment, the method comprises discovering one or more of the software components that are instantiated in a software image of each computing machine according to the corresponding component signatures. However, the software images may be of any type (e.g., in different formats) and they may be software images that are currently in use and/or software images that have been previously saved in corresponding snapshots. The instantiated software components may be discovered at any time (e.g., whenever a significant update is applied to each software image) and in any way (e.g., with ad-hoc techniques without any inventory tool, with different providers for corresponding types of software components). Moreover, the discovery of each instantiated software component may occur in any way according to the corresponding component signature (e.g., requiring a manual confirmation in uncertain cases).

In an embodiment, the method comprises detecting one or more of the connections, each one being established between at least two instantiated software components of different computing machines, according to the corresponding connection signatures. However, the established connections may be detected at any time (even independently of the discovering of the software components). Moreover, the detection of each established connection may occur in any way according to different, alternative or additional criteria (e.g., according to the match of the values of connection/validation parameters, to the fulfillment of connection/validation rules or to any combinations thereof, with or without any manual intervention).

In an embodiment, the method comprises associating each software image with a software deployment of the software application of each established connection of the software image. However, the software images may be associated with the corresponding software deployments in any way (e.g., locally by each snapshot engine and/or centrally by the recovery engine).

In an embodiment, the method comprises receiving a restore command for restoring a target recovery point selected among a plurality of recovery points, where each recovery point comprises a previously taken snapshot of each software image of one or more of the software deployments being directly or indirectly overlapped. However, the restore command may be received in any way (e.g., submitted directly to the snapshot engines). Moreover, the target recovery point may be selected in any way (e.g., by simply selecting a snapshot of a specific virtual machine to be restored).

In an embodiment, the method comprises restoring the target recovery point in response to the restore command by restoring the snapshots thereof on the corresponding computing machines. However, the recovery point may be restored in any way (e.g., always after saving a corresponding new recovery point). Moreover, the snapshots may be restored on the corresponding computing machines in any way (e.g., locally by each snapshot engine that forwards the restore command to the corresponding snapshot engine of each connection that is established from the snapshot that has been restored).

In an embodiment, the method comprises receiving a save command for saving a selected one of the software deployments. However, the save command may be received in any way (e.g., submitted to the recovery manager). Moreover, the software deployment to be save may be selected in any way (e.g., either explicitly or implicitly by simply selecting a software image thereof).

In an embodiment, the method comprises saving a new one of the recovery points by taking a snapshot of the software images of the selected software deployment and of each other of the software deployments directly or indirectly overlapped to the selected software deployment. However, the new recovery point may be saved in any way (e.g., centrally by the recovery manager that determines the software deployments overlapped to the selected software deployment and then submits the save command to the snapshot engines that have to take a snapshot of the corresponding software images) and the snapshots may be taken in any way (e.g., by saving them into a common repository for all the computing machines).

In an embodiment, the step of accessing a catalogue memory structure, the step of discovering one or more of the software components and the step of detecting one or more of the connections are performed under the control of a dedicated snapshot agent for each computing machine. However, the snapshot agents may be any type (e.g., running in the corresponding virtual machines). In any case, the possibility of controlling the management of the computing system centrally (without any snapshot agents) is not excluded.

In an embodiment, the connection signatures are for detecting the connections each one from a source one of the software components to a target one of the software components. The step of detecting one or more of the connections comprises detecting each connection established to the corresponding target software component instantiated in a target one of the software images from the corresponding source software component instantiated in a source one of the software images according to the corresponding connection signature. However, the connection signatures may be of any type (e.g., mono-directional and/or bi-directional) for detecting the corresponding connections accordingly.

In an embodiment, the step of discovering one or more of the software components comprises publishing an indication of each instantiated target software component in a shared memory structure in response to the discovery thereof. However, the shared memory structure may be of any type (e.g., a file or a database) and it may be shared in any way (e.g., under the control of a dedicated monitor). Moreover, the indication of each instantiated target software component may be defined by different, alternative or additional items (e.g., only its values of the connection parameters with or without the values of the validation parameters, without any timestamp, with a return code of its deployment) and it may be shared among the snapshot agents in any other way, even without any shared memory structure (e.g., by broadcasting them).

In an embodiment, the step of detecting one or more of the connections comprises detecting the connections according to the indications of the instantiated target software components in the shared memory structure by the snapshot agents of the instantiated source software components. However, the connections may be detected in any way according to the shared memory structure (e.g., by each snapshot engine that downloads and maintains up-to-date a local version thereof).

In an embodiment, for each connection the catalogue memory structure stores one or more source instructions for collecting the values of one or more connection parameters of the source software component. However, the source instructions for each connection may be in any number and for collecting any number of connection parameters (e.g., one or more by each one of them). Moreover, the source instructions may be of any type (e.g., for parsing files), and they may be for collecting the values of any connection parameters, either of logical and/or physical type (e.g., hostnames, IP addresses, etc.).

In an embodiment, for each connection the catalogue memory structure stores one or more target instructions for collecting the values of the connection parameters of the target software component. However, the target instructions may be in any number and of any type (e.g., either the same as or different of the source instructions).

In an embodiment, the step of publishing an indication of each instantiated target software component comprises collecting the values of the connection parameters of each instantiated target software component according to the corresponding target instructions. However, the values of the connection parameters of the instantiated target software component may be collected in any way (e.g., by translating the target instructions defined at logical level into executable commands), even without the need of any target instructions (e.g., by dedicated providers that collect them directly).

In an embodiment, the step of publishing an indication of each instantiated target software component comprises publishing the values of the connection parameters of each instantiated target software component into the shared memory structure. However, this operation may be performed in any way (e.g., by directly writing into the shared memory structure or by submitting a corresponding request to a monitor thereof).

In an embodiment, the step of detecting the connections comprises collecting the values of the connection parameters of each instantiated source software component according to the corresponding source instructions. However, the values of the connection parameters of the instantiated source software component may be collected in any way, even without the need of any source instructions (e.g., either in the same or in a different way with respect to the target software component).

In an embodiment, the step of detecting the connections comprises detecting each established connection in response to a match between the values of the connection parameters of the corresponding instantiated source software component and the values of the connection parameters of the corresponding instantiated target software component. However, the match may be of any type (e.g., when a predefined percentage of connection parameters having the same values is found, when the values of the target software component fall within a predefined range of the values of the source software component).

In an embodiment, the step of detecting the connections comprises (e.g., for each established connection in each source software image) notifying the established connection in the source software image by the snapshot agent of the source software image to the snapshot agent of the corresponding target software image. However, this notification may be performed in any way (e.g., by broadcasting it).

In an embodiment, the step of detecting the connections comprises (for each established connection in each source software image) detecting a further corresponding one of the established connections in the target software image in response to the notification of the established connection in the source software image. However, this further connection may be detected in any way, even directly in the target software image without the need of any notification (e.g., when a corresponding connection signature is provided in the catalogue memory structure).

In an embodiment, for at least one of the connections the catalogue memory structure stores one or more validation instructions for collecting the values of one or more validation parameters of the target software component. However, the validation instructions for each connection may be in any number (down to none) and for collecting any number of validation parameters (e.g., one or more by each one of them). Moreover, the validation instructions may be of any type (e.g., for parsing files) and for collecting the values of any validation parameters, either of logical and/or physical type (e.g., service levels).

In an embodiment, for at least one of the connections the catalogue memory structure stores a validation rule for validating the connection. However, the validation rule may be of any type (e.g., with statements of any type and combined in any way, such as with logical operators and/or programming constructs, such as if-then-else), or they may also be missing at all.

In an embodiment, the step of publishing an indication of each instantiated target software component comprises collecting the values of the validation parameters of each instantiated target software component according to the corresponding validation instructions. However, the values of the validation parameters may be collected in any way, even without the need of any validation instructions (e.g., either in the same or in different way with respect to the source/target parameters).

In an embodiment, the step of publishing an indication of each instantiated target software component comprises publishing the values of the validation parameters of each instantiated target software component into the shared memory structure. However, the values of the validation parameters may be published anywhere (e.g., together with or separated from the values of the connection parameters) and in any way (e.g., either in the same or in a different way with respect to the publication of the values of the connection parameters).

In an embodiment, the step of detecting the connections comprises detecting each established connection further in response to a fulfillment of the corresponding validation rule by the values of the validation parameters of the corresponding instantiated target software component. However, the fulfillment of the validation rule may be determined in any way (e.g., when at least a predefined percentage of its conditions are satisfied). In any case, this verification may be combined with the one of the corresponding connection signature (e.g., when the validation rule is integrated in the connection signature).

In an embodiment, the step of publishing an indication of each instantiated target software component comprises collecting a timestamp corresponding to the discovery of the each instantiated target software component. However, the timestamp may be collected in any way (e.g., at the beginning of the analysis of the whole software image or individually at the discovery of each target software component).

In an embodiment, the step of publishing an indication of each instantiated target software component comprises publishing the timestamp of each instantiated target software component into the shared memory structure. However, the timestamp may be published anywhere (e.g., together with or separated from the values of the connection/validation parameters) and in any way (either in the same or in a different way with respect to the publication of the values of the connection/validation parameters).

In an embodiment, the detecting the connections comprises detecting each established connection further according to a comparison between a current time and the timestamp of the instantiated target software component. However, the current time may be defined in any way (e.g., taken at the beginning of the analysis of the whole software image or individually at the discovery of each source software component). Moreover, the current time and the timestamp may be compared in any way (e.g., only at the level of their days).

In an embodiment, the step of detecting the connections comprises (for each established connection) sending an analysis request from the snapshot agent of the source software image to the snapshot agent of the target software image in response to a difference between the current time and the timestamp of the instantiated target software component higher than a threshold. However, the threshold may have any value and the analysis request may be sent in any way (e.g., via the recovery manager).

In an embodiment, the step of detecting the connections comprises (for each established connection) repeating said step of discovering one or more of the software components in the target software image in response to the analysis request. However, any other action may be requested on the target software image in response to the difference between the current time and the timestamp being too high (e.g., a manual verification).

In an embodiment, the step of detecting the connections comprises (for each established connection) repeating at least part of said step of detecting the connections in the source software image in response to repeating the step of discovering one or more of the software components in the target software image. However, the detection of the connections may be repeated in any way (e.g., completely). In any case, nothing prevents behaving differently in this situation (e.g., simply discarding the connection), down to avoid this verification at all.

In an embodiment, the save command is received by the snapshot agent of a selected one of the software images of the selected software deployment. However, the save command may be provided in any way to the snapshot agent (e.g., submitted by the recovery manager).

In an embodiment, the step of saving a new one of the recovery points comprises forwarding the save command that has been received by each snapshot agent to the corresponding snapshot agent of each corresponding established connection. However, the save command may be provided to the snapshot agents in any other way (e.g., directly by the recovery manager to all of them).

In an embodiment, the step of saving a new one of the recovery points comprises taking a snapshot of the corresponding software image in response to the receiving of the save command by each snapshot agent. However, the snapshots may be taken in any other way (e.g., directly by the recovery manager).

In an embodiment, the step of restoring the target recovery point comprises (before restoring the snapshots thereof on the corresponding computing machines) determining one or more of the software deployments corresponding to the target recovery point. However, these software deployments may be determined in any way (e.g., according to their tree).

In an embodiment, the step of restoring the target recovery point comprises (before restoring the snapshots thereof on the corresponding computing machines) saving a new one of the recovery points (for one or more of the software deployments corresponding to the target recovery point and for each one of the software deployments directly or indirectly overlapped thereto) by taking a snapshot of the corresponding software images.

However, the software deployments to be saved may be determined in any way (e.g., only when one or more software images thereof are to be changed during the restoring of the target recovery point). Moreover, the new recovery point may be saved in any way (e.g., submitting a save command to the snapshot agents of all its software images directly by the recovery manager). In any case, other action may be taken on these software images (e.g., requesting their manual suspension), or vice-versa a new recovery point may be always saved in response to every recovery command.

Generally, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions executable by a computing system to cause the computing system to perform the same method. However, the computer program may be implemented as a stand-alone module, as a plug-in for a pre-existing software application (for example, a recovery tool), or even directly in the latter.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment provides a system comprising means configured for performing the steps of the above-mentioned method. An embodiment provides a system for managing a plurality of computing machines. The system comprises a catalogue memory structure storing a plurality of component signatures for discovering corresponding software components and, for each one of a plurality of software applications, and indication of one or more of the software components belonging to the software application and one or more connection signatures for detecting corresponding connections each one between at least two of the software components of the software application, a circuitry (e.g., a hardware suitably configured, for example, by software) for discovering one or more of the software components being instantiated in a software image of each computing machine according to the corresponding component signatures, a circuitry for detecting one or more of the connections each one being established between at least two instantiated software components of different computing machines according to the corresponding connection signatures, a circuitry for associating each software image with a software deployment of the software application of each established connection of the software image, a circuitry for receiving a restore command for restoring a target recovery point selected among a plurality of recovery points, each recovery point comprising a previously taken snapshot of each software image of one or more of the software deployments being directly or indirectly overlapped, and a circuitry for restoring the target recovery point in response to the restore command by restoring the snapshots thereof on the corresponding computing machines.

However, the system may have a different architecture (e.g., a local, wide area, global, cellular or satellite network) and it may exploit any type of (wired and/or wireless) connections. However, the implementation on a stand-alone computer is not excluded.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

It should be noted that the above-described features may be combined in any way. For example, each block in the flowchart or block diagrams may represent a module, segment, or portion of instructions, which comprises one or more executable instructions for implementing the specified logical function(s), which may be combined to provide a combination of blocks in the block diagrams and/or flowchart illustrations. Accordingly, in some embodiments, each of the blocks shown may be executed substantially concurrently.

The invention claimed is:

1. A method for managing a plurality of computing machines, the method comprising:
   accessing a catalogue memory structure storing a plurality of component signatures;
   discovering one or more software components being instantiated in a software image of each computing machine according to corresponding ones of the plurality of component signatures;
   detecting, according to one or more connection signatures, one or more connections each being established between at least two instantiated software components of different computing machines;
   receiving a restore command for restoring a target recovery point selected among a plurality of recovery points based on the one or more connections; and
   restoring the target recovery point in response to the restore command by restoring snapshots associated with the target recovery point on corresponding computing machines.

2. The method according to claim 1, further comprising:
   receiving a save command for saving a selected software deployment associated with a software image; and
   saving a new recovery point by taking a snapshot of each software image of the selected software deployment and of each of the software deployments directly or indirectly overlapped to the selected software deployment.

3. The method according to claim 2, wherein said accessing, said discovering and said detecting are performed under control of a dedicated snapshot engine for each computing machine.

4. The method according to claim 1, wherein the one or more connection signatures detect one or more connections between a source software component corresponding to a target software component by:
   detecting each connection established to the target software component instantiated in a target software image from the corresponding source software component instantiated in a source software image according to the one or more connection signatures.

5. The method according to claim 4, wherein:
said discovering the one or more software components comprises publishing an indication of each instantiated target software component in a shared memory structure in response to the discovery; and
said detecting the one or more connections comprises detecting the one or more connections according to the indications of the instantiated target software components in the shared memory structure by snapshot engines of corresponding computing machines associated with the instantiated source software components.

6. The method according to claim 5, wherein for each connection the catalogue memory structure stores one or more source instructions for collecting values of one or more connection parameters of the source software component and one or more target instructions for collecting values of the connection parameters of the target software component, said publishing the indication of each instantiated target software component comprises:
collecting the values of the connection parameters of each instantiated target software component according to the corresponding target instructions; and
publishing the values of the connection parameters of each instantiated target software component into the shared memory structure;
wherein said detecting the one or more connections comprises:
collecting the values of the connection parameters of each instantiated source software component according to the corresponding source instructions; and
detecting each established connection in response to a match between the values of the connection parameters of the corresponding instantiated source software component and the values of the connection parameters of the corresponding instantiated target software component.

7. The method according to claim 5, wherein said detecting the one or more connections comprises, for each established connection in each source software image:
notifying, the established connection in the source software image by the snapshot engine of the source software image to the snapshot engine of the corresponding target software image; and
detecting a further corresponding established connection in the target software image response to the notification of the established connection in the source software image.

8. The method according to claim 5, wherein for at least one of the one or more connections the catalogue memory structure stores one or more validation instructions for collecting values of one or more validation parameters of the target software component and a validation rule for validating the connection, said publishing the indication of each instantiated target software component comprises:
collecting the values of the one or more validation parameters of each instantiated target software component according to the corresponding, validation instructions; and
publishing the values of the one or more validation parameters of each instantiated target software component into the shared memory structure;
wherein said detecting the one or more connections comprises detecting each established connection further in response to a fulfillment of the corresponding validation rule by the values of the validation parameters of the corresponding instantiated target software component.

9. The method according to claim 5, wherein said publishing the indication of each instantiated target software component comprises:
collecting a timestamp corresponding to the discovery of each instantiated target software component; and
publishing the timestamp of each instantiated target software component into the shared memory structure.

10. The method according to claim 9, wherein said detecting the one or more connections comprises:
detecting each established connection further according to a comparison between a current time and the timestamp of the instantiated target software component.

11. The method according to claim 10, wherein said detecting the one or more connections comprises, for each established connection:
sending an analysis request from the snapshot engine of the source software image to the snapshot engine of the target software image in response to a difference between the current time and the timestamp of the instantiated target software component higher than a threshold;
repeating said discovering one or more software components in the target software image in response to the analysis request; and
repeating at least part of said detecting the one or more connections the source software image in response to said repeating said discovering one or more software components in the target software image.

12. The method according to claim 3, wherein the save command is received by the snapshot engine of a selected one of the software images of the selected software deployment, said saving the new recovery point comprises:
forwarding the save command being received by each snapshot engine to the corresponding snapshot engine of each corresponding established connection; and
taking a snapshot of the corresponding software image in response to the receiving of the save command by each snapshot engine.

13. The method according to claim 1, further comprising, before restoring the snapshots on the corresponding computing machines:
saving a new recovery point, for one or more software deployments corresponding to the target recovery point and for each of the one or more software deployments directly or indirectly overlapped by taking a snapshot of each of the corresponding software images.

14. A computer program product, the computer program product comprising a computer readable storage medium having program instructions embodied therewith, the program instructions executable by a computing system to cause the computing system to perform a method for managing a plurality of computing machines, the method comprising:
accessing a catalogue memory structure storing a plurality of component signatures;
discovering one or more software components being instantiated in a software image of each computing machine according to corresponding ones of the plurality of component signatures;
detecting, according to one or more connection signatures, one or more connections each being established between at least two instantiated software components of different computing machines;

receiving a restore command for restoring a target recovery point selected among a plurality of recovery points based on the one or more connections; and restoring the target recovery point in response to the restore command by restoring snapshots associated with the target recovery point on corresponding computing machines.

15. A system for managing a plurality of computing machines, the system comprising:

a catalogue memory structure storing a plurality of component signatures;

circuitry for discovering one or more software components being instantiated in a software image of each computing machine according to corresponding ones of the plurality of component signatures;

circuitry for detecting, according to one or more connection signatures, one or more connections each being established between at least two instantiated software components of different computing machines;

circuitry for receiving a restore command for restoring a target recovery point selected among a plurality of recovery points based on the one or more connections; and circuitry for restoring the target recovery point in response to the restore command by restoring snapshots associated with the target recovery point on corresponding computing machines.

16. The system according to claim 15, further comprising circuitry for:

receiving a save command for saving a selected software deployment associated with a software image; and saving a new recovery point by taking a snapshot of each software image of the selected software deployment and of each of the software deployments directly or indirectly overlapped to the selected software deployment.

17. The system according to claim 16, wherein said accessing, said discovering and said detecting are performed under control of a dedicated snapshot engine for each computing machine.

18. The system according to claim 17, wherein the one or more connection signatures detect one or more connections between a source software component corresponding to a target software component by:

detecting each connection established to the target software component instantiated in a target software image from the corresponding source software component instantiated in a source software image according to the one or more connection signatures.

19. The system according to claim 18, wherein:

said discovering the one or more software components comprises publishing an indication of each instantiated target software component in a shared memory structure in response to the discovery; and said detecting the one or more connections comprises detecting the one or more connections according to the indications of the instantiated target software components in the shared memory structure by snapshot engines of corresponding computing machines associated with the instantiated source software components.

20. The system according to claim 19, wherein for each connection the catalogue memory structure stores one or more source instructions for collecting values of one or more connection parameters of the source software component and one or more target instructions for collecting values of the connection parameters of the target software component, said publishing the indication of each instantiated target software component comprises:

collecting the values of the connection parameters of each instantiated target software component according to the corresponding target instructions; and publishing the values of the connection parameters of each instantiated target software component into the shared memory structure;

wherein said detecting the one or more connections comprises:

collecting the values of the connection parameters of each instantiated source software component according to the corresponding source instructions; and detecting each established connection in response to a match between the values of the connection parameters of the corresponding instantiated source software component and the values of the connection parameters of the corresponding instantiated target software component.

* * * * *